US006699575B1

(12) United States Patent
Dagher et al.

(10) Patent No.: US 6,699,575 B1
(45) Date of Patent: *Mar. 2, 2004

(54) WOOD COMPOSITE PANELS FOR DISASTER-RESISTANT CONSTRUCTION

(75) Inventors: Habib J. Dagher, Veazie, ME (US); William G. Davids, Bangor, ME (US)

(73) Assignee: University of Maine System Board of Trustees, Bangor, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/513,589

(22) Filed: Feb. 25, 2000

(51) Int. Cl.[7] .............. B32B 21/02; B32B 3/02; B32B 5/12; E04C 1/00; E04B 9/00
(52) U.S. Cl. .............. 428/292.4; 428/96; 428/114; 52/309; 52/506.01
(58) Field of Search .............. 428/292.4, 96, 428/114; 52/506.1, 309, 506.01

(56) References Cited

U.S. PATENT DOCUMENTS

| | | | | |
|---|---|---|---|---|
| 2,641,029 A | 6/1953 | Trinmer | .............. | 20/4 |
| 3,754,977 A | 8/1973 | Lankheet | .............. | 117/105.5 |
| 3,788,682 A | 1/1974 | Ehrlich | .............. | 296/28 M |
| 3,920,871 A | * 11/1975 | Johnson | .............. | 156/148 |
| 4,091,153 A | * 5/1978 | Holman | .............. | 428/114 |
| 4,158,078 A | 6/1979 | Egger et al. | .............. | 428/103 |
| 4,297,817 A | 11/1981 | Bullock et al. | .............. | 52/169.6 |
| 4,346,541 A | 8/1982 | Schmitt | .............. | 52/309.11 |
| 4,984,947 A | 1/1991 | Flauraud | .............. | 411/43 |
| 5,018,324 A | 5/1991 | Lankheet | .............. | 52/169.7 |
| 5,106,666 A | 4/1992 | Fitzgerald et al. | | |
| 5,153,058 A | 10/1992 | Hall et al. | .............. | 428/319.7 |
| 5,565,257 A | 10/1996 | Tingley | | |
| 5,721,036 A | * 2/1998 | Tingley | .............. | 428/96 |
| 5,910,352 A | 6/1999 | Tingley | | |
| 6,050,047 A | 4/2000 | Covelli et al. | | |
| 6,051,301 A | 4/2000 | Tingley | | |
| 6,217,976 B1 | * 4/2001 | Macpherson et al. | .............. | 428/106 |
| 6,490,834 B1 | * 12/2002 | Dagher | .............. | 52/506.1 |

OTHER PUBLICATIONS

Samuel Devlin, "Devlin's Boatbuilding" How To Build Any Boat The Stitch And Glue Way © 1996.

(List continued on next page.)

*Primary Examiner*—Cynthia H. Kelly
*Assistant Examiner*—L Ferguson
(74) *Attorney, Agent, or Firm*—MacMillan, Sobanski & Todd, LLC

(57) ABSTRACT

A wood sheathing panel, suitable for use in building construction, includes reinforcement strips of fiber reinforced polymer material incorporated into the panel. The reinforcement strips cover an area that is within the range of from about 5 to about 50 percent of the surface area of the panel. The reinforcement strips of fiber reinforced plastic material can be incorporated in the perimeter of the panel, or can be incorporated into the corners of the panel. The spacing of the intermittently incorporated reinforcement strips can generally coincide with a standard spacing of framing members so that when the wood sheathing panel is applied to a building frame, the reinforcement strips are generally aligned with framing members of the building. Preferably, the reinforcement strips are sufficient to provide an increased ductility over an equivalent unreinforced wood sheathing panel in an amount within the range of from about 75 percent to about 500 percent. A plurality of the wood sheathing panels of the invention can be assembled together in building construction as one element of a group consisting essentially of shear walls, horizontal diaphragms and roof diaphragms.

27 Claims, 7 Drawing Sheets

OTHER PUBLICATIONS

APA—The Engineered Wood Association Homeowner's Guide, Build Strong Walls with Plywood and OSB; 1997 APA—The Engineered Wood Association.

APA—Construction Basics—Wall Systems; http://www.apawood.org/level_b.cfm?content=app_bas_wall.

APA—Oriented Strand Board (OSB); http://www.apawood.org/level_b.cfm?content=prd_osb_main.

Engineered Wood Construction Guide; 2001 APA The Engineered Wood Association.

National Evaluation Report; Report No. NER–108, Reissued Oct. 1, 1999; 1999 National Evaluation Service, Inc.

ES Report, ICBO Evaluation Service, Inc.; ER–5681; Reissued Jan. 1, 2002.

* cited by examiner

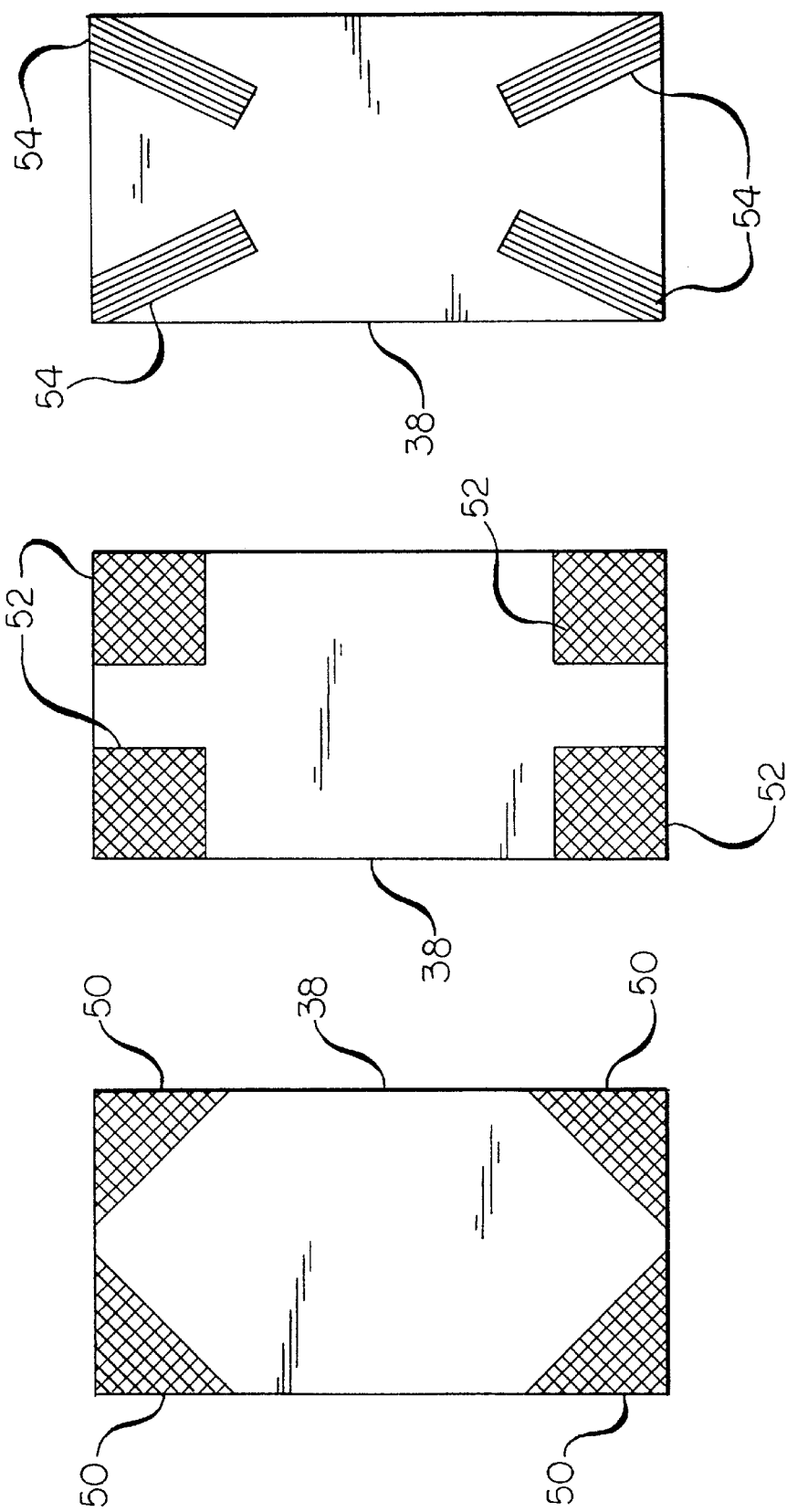

WOOD COMPOSITE PANELS FOR DISASTER-RESISTANT CONSTRUCTION

BACKGROUND OF THE INVENTION

This invention relates in general to panels useful in making strengthened wood-frame construction so that the construction has increased resistance to high wind, earthquake and blast loadings.

A very common wood frame construction method uses wood or steel studs or wood or steel framing with plywood or Oriented Strand Board (OSB) sheathing panels or stucco sheathing. The framing/sheathing combination forms shear walls and horizontal diaphragms which resist horizontal and vertical loads applied to the structure. This form of construction is used in the majority of single family homes in the United States, as well as a significant portion of multi-family, commercial and industrial facilities.

While the system has generally performed well, the economic losses in the United States due to natural disasters, such as hurricanes, earthquakes and tornadoes, have been mounting. The economic losses caused by these natural disasters in the United States has averaged about $1 billion/week in recent years. Most of these losses are due to hurricanes (80%) and earthquakes (10%). For example, the loss of roof sheathing under hurricane winds has often been attributed to improper fastening of the sheathing to the framing, such as by the use of larger nail spacing than allowed by code, nails missing the support framing members, or over-driven nails. Inadequate panel-to-framing nailing schedules do not allow the full shear strength of the panel to be developed, resulting in premature failures of shear walls, possibly leading to severe damage or collapse of the structure. Loss of sheathing in hurricanes weakens the roof structure and can lead to roof failures. The water damage resulting from a loss of roof sheathing or roof failures has been a major contributor to economic losses in hurricanes. Surveys also show that a significant portion of the damage resulting from hurricanes or earthquakes occurs in nonstructural parts of the home due to excessive deformation or movements of the structure. The cost to repair nonstructural damage often makes it necessary to rebuild the structure rather than to repair it.

While the knowledge to mitigate hurricane and earthquake damage exists today, building code provisions are often misunderstood by builders, and compliance with regulations is difficult to enforce because of the difficulty of inspecting in the field. As a result, surveys show that a significant portion of the damage to homes and property caused by natural disasters is due to lack of conformance to codes. Improper connections between walls at building corners, such as non-overlapping top plates or improper or missing hold-downs to tie the shear walls to the foundations, are further examples of poor construction practices that are difficult to inspect.

Therefore, there is a need for easy-to-manufacture, inexpensive construction panels suitable for providing a strengthened and stiffened construction for improved resistance to high wind loadings, and increased ductility and energy dissipation capacity to reduce earthquake damage. The construction panels should increase the strength and ductility of wood buildings and reduce the deformation of the buildings to limit damage to non-structural members.

SUMMARY OF THE INVENTION

The above objects as well as other objects not specifically enumerated are achieved by a wood sheathing panel, suitable for use in building construction, that includes reinforcement strips of fiber reinforced polymer material incorporated into the panel. The reinforcement strips cover an area that is within the range of from about 5 to about 50 percent of the surface area of the panel.

In a specific embodiment of the invention, the reinforcement strips of fiber reinforced plastic material are incorporated in the perimeter of the panel. In another specific embodiment of the invention, the reinforcement strips of fiber reinforced plastic material are incorporated into the corners of the panel.

In another specific embodiment of the invention, the spacing of the intermittently incorporated reinforcement strips generally coincides with a standard spacing of framing members so that when the wood sheathing panel is applied to a building frame, the reinforcement strips are generally aligned with framing members of the building.

According to this invention, there is also provided a plurality of wood sheathing panels assembled together in building construction as one element of a group consisting essentially of shear walls, horizontal diaphragms and roof diaphragms, where the wood sheathing panels are suitable for use in building construction, and include reinforcement strips of fiber reinforced polymer material incorporated into the panel. The reinforcement strips cover an area that is within the range of from about 5 to about 50 percent of the surface area of the panel.

Various objects and advantages of this invention will become apparent to those skilled in the art from the following detailed description of the preferred embodiment, when read in light of the accompanying drawings.

BRIEF DESCRIPTION OF THE DRAWINGS

FIGS. 6–8 are schematic plan views of a wood sheathing panel having reinforcement strips in the corners according to the invention.

DETAILED DESCRIPTION OF THE INVENTION

Figure 1:
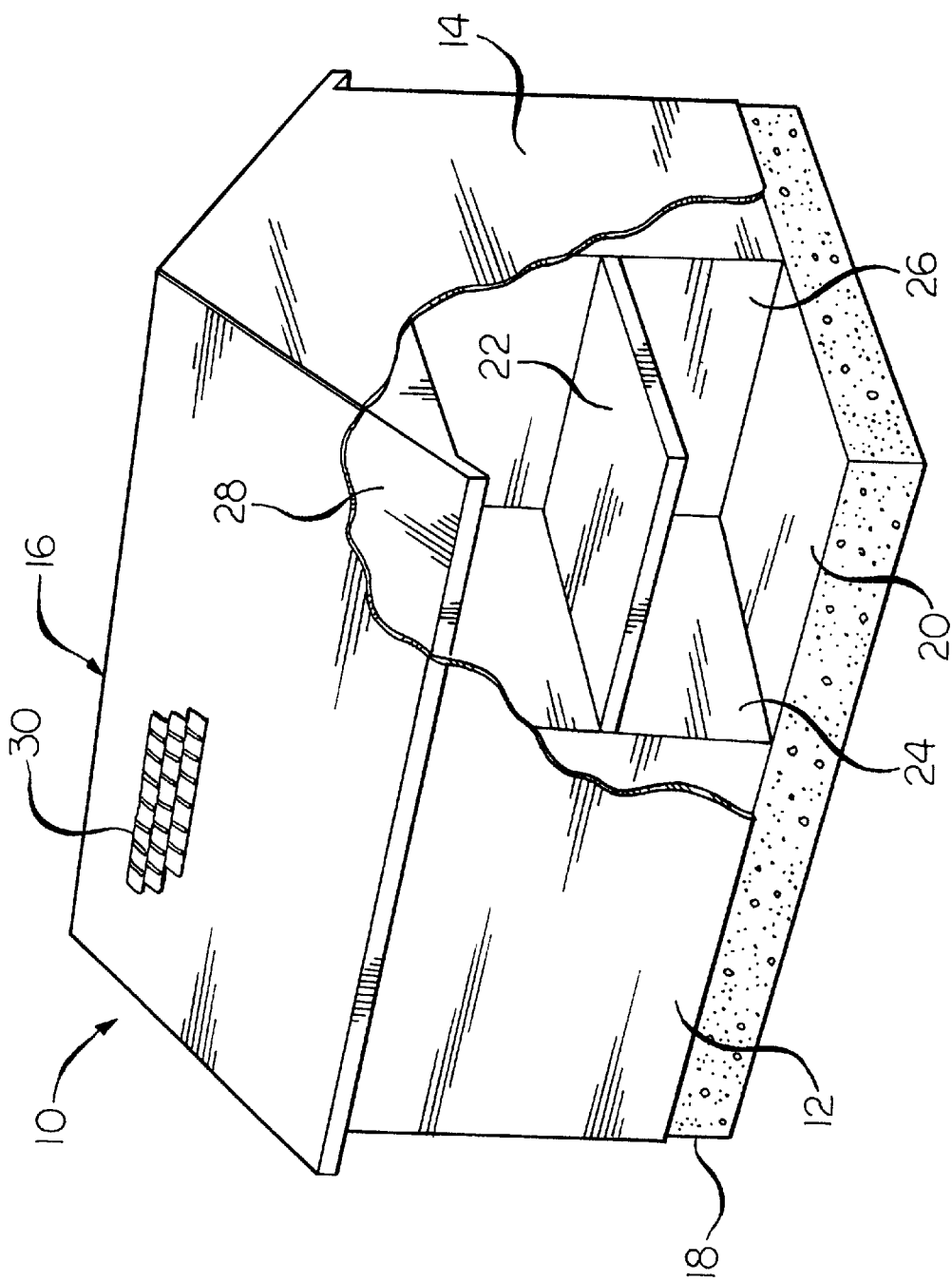
FIG. 1 is a schematic plan view of a building and roof incorporating the wood sheathing panels of the invention.

In general, this invention consists of a simple and effective design for reinforcing wood sheathing panels that can be used to strengthen conventional wood construction and increase its resistance to loading from blasts of various types, from earthquakes, and from high winds such as generated by tornadoes or hurricanes. The wood sheathing panels of the invention can be used with either wood, wood composite or steel framing. The wood sheathing panels of the invention, which can be for example fiber-reinforced Oriented Strand Boards (hereinafter "OSB") or plywood panels, significantly improve the disaster resistance and lower the ownership cost of conventional wood-frame construction. The invention involves incorporating synthetic fibers or fiber reinforced polymer (also known as fiber reinforced plastic), both hereinafter referred to as "FRP strips" and also as "reinforcement strips") into wood sheathing panels used to build a structure or building to enhance the resistance of the structure to earthquakes and high winds from hurricanes and tornadoes. For purposes of this invention, wood sheathing includes plywood, OSB, and other wood based composite panels. The wood sheathing panels are preferably reinforced with such synthetic fibers as E-glass, carbon fibers, aramid fibers or combinations of these fibers, although other reinforcement fibers can be used. To minimize costs, the synthetic reinforcement is preferably highest in regions of the panels that have been observed to fail under hurricane or earthquake loadings. The reinforcement is preferably oriented and adhered within the OSB or plywood panel in the regions of high stresses caused by the loading.

Benefits of the invention include addressing the problem of the splitting of the wood sheathing panels at the perimeter nails. Shear-wall failures are often precipitated by inadequate nailing schedules, including small edge distances or large perimeter nail spacing. This situation can lead to edge splitting of the sheathing panel, preventing the full shear capacity of the panel from being developed. The wood sheathing panel of the invention also addresses the loss of energy-dissipation capacity of wood shear walls under load cycling. Tests have shown that the enlargement of nail holes of conventional panels due to localized crushing of panel fibers reduces the energy-dissipation capabilities of shear walls after the initial load cycle. Also, the wood sheathing panel of the invention addresses fracture of the sheathing panels near the corners. Even with proper nailing schedules, stress concentrations near wall openings have been observed to cause panel fracture at the corners. Problems with nail pull-out, nail-head pull-through, and over-driven nails are also reduced by use of the wood sheathing panels of the invention. With increased nail lateral resistance, reduced minimum edge distance requirements, and increased panel strength, shear walls constructed from wood sheathing panels according to the invention will be less sensitive to construction errors. Total building ownership costs, including insurance and reconstruction costs, will be lowered because of the reduced risk of life, injury, and property destruction from natural hazards, and significantly reduced structural and nonstructural damage caused by hurricane and seismic events.

Shear wall failures are often precipitated by inadequate panel perimeter nail edge distance or by exceeding the allowed perimeter nail spacing. These poor nailing techniques lead to edge splitting of the sheathing panel, preventing the full shear capacity of the panel from being developed. Building failures in earthquake events usually occur due to nail pullout or edge splitting. The energy dissipation capacity of a building structure can be diminished under load cycling. The enlarging of nail holes due to localized crushing of panel fibers reduces the energy dissipation capabilities of shear walls after the initial load cycle. The loss of capacity in constant displacement cyclic load tests may be due to localized crushing of wood fibers around the nails. Another failure mechanism involves fracture of sheathing panels near the corners. If nailing is sufficient to develop the full panel strength, stress concentrations near wall openings have been observed to cause panel fracture. Nail pullout, nail head pull-through, and over-driven nails can all significantly reduce nail holding capacity.

The wood sheathing panels of the invention are suitable for use in building construction. As shown in FIG. 1, a building, indicated generally at 10, is comprised of longitudinal walls 12, end walls 14, roof 16 and foundation 18. The longitudinal walls 12 and end walls 14 are exterior shear walls. The cutaway portion of FIG. 1 reveals representative horizontal floor diaphragms 20 and 22, and interior shear walls 24 and 26. The cutaway also shows that the roof 16 is comprised of roof diaphragms 28. The roof 16 is covered with an exterior roof covering in the form of shingles 30.

Figure 3:
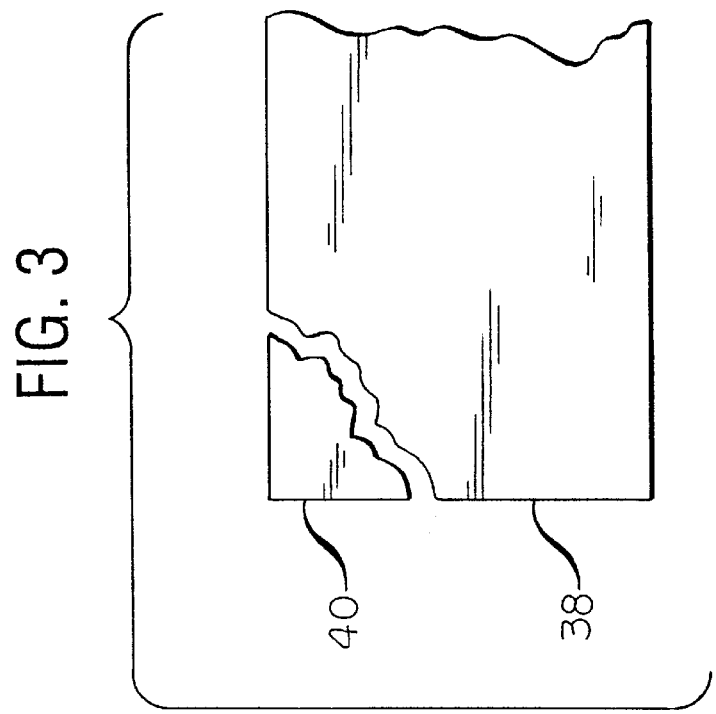
FIG. 3 is a schematic plan view of a wood sheathing panel of the invention, showing corner tear-out in a panel.
Figure 2:
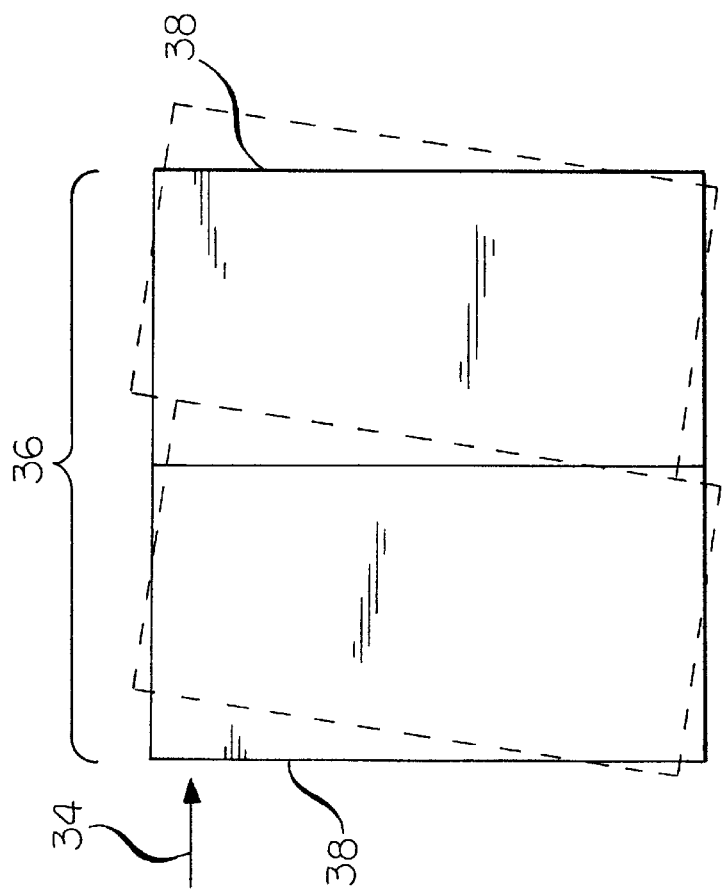
FIG. 2 is a schematic plan view of a panel assembly of two wood sheathing panels of the invention, indicating how the panels react to a lateral stress load.

One problem associated with wind and earthquake loads is that a tremendous lateral shear force is applied to various structural members. As shown in FIG. 2, the lateral shear force, indicated by arrow 34, is applied to a panel assembly 36, which is comprised of two wood sheathing panels 38 joined together. The lateral shear force tends to tip or rotate the wood sheathing panels 38, as shown in the phantom outline. The greatest stress on the wood sheathing panels 38 is around the perimeter, and particularly at the corners of the panels. As shown in FIG. 3, a common failure mechanism is a tearing or separation of the corner 40 of the panel 36 under extreme lateral loading.

Figure 4:
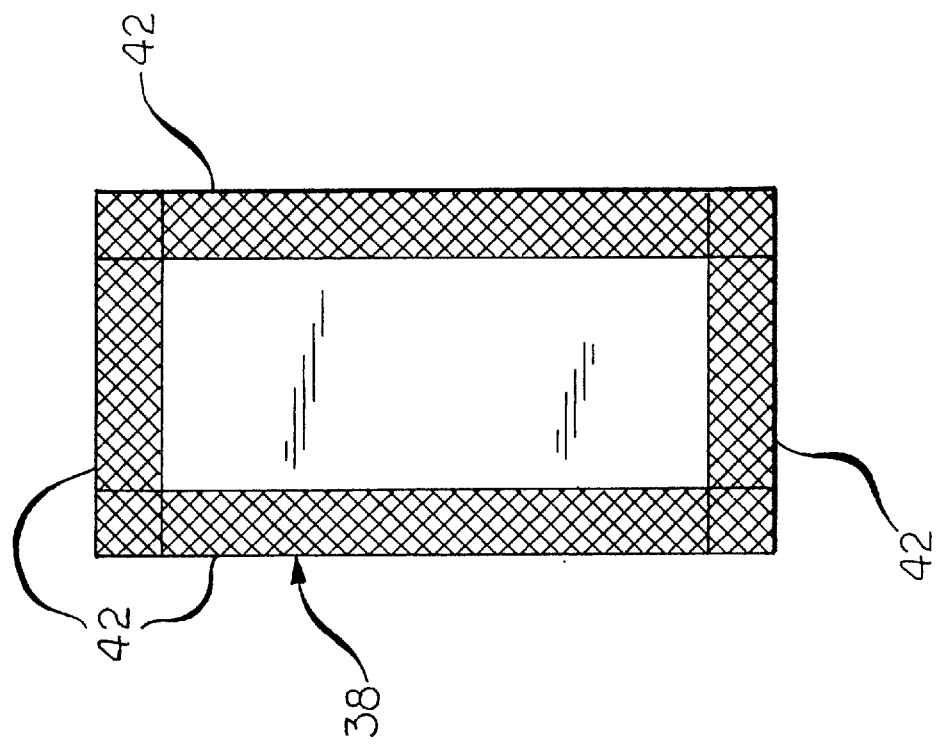
FIG. 4 is a schematic plan view of a wood sheathing panel having reinforcement strips incorporated into the perimeter of the panel according to the invention.

To provide additional strength to withstand lateral loading the wood sheathing panel 38 preferably has reinforcement strips 42 of fiber reinforced plastic material (hereinafter, also referred to as "FRP reinforcements") incorporated into the perimeter of the panel, as shown in FIG. 4. The composition of the FRP resinous material, and the fiber orientation, type, spacing, density, diameter, strength, coatings and sizing material, as well as other characteristics fiber/laminate architecture will vary depending on the intended application and the availability and cost of the FRP materials. A more detailed description of the FRP reinforcements and design is given below.

Figure 5:
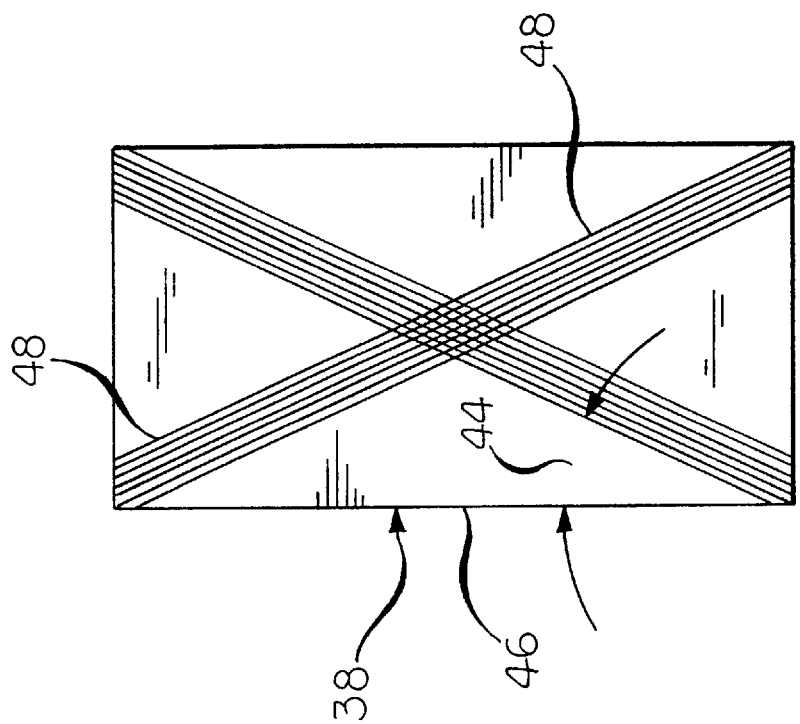
FIG. 5 is a schematic plan view of a wood sheathing panel having reinforcement strips in a truss arrangement according to the invention.

As shown in FIG. 5, the wood sheathing panel 38 includes FRP reinforcements 48 incorporated into the panel in diagonal strips that are at an acute angle 44 to the edges 46 of the panel. The reinforcement strips 42 extend between opposed diagonal corners of the panel 38. Wood sheathing panels having this truss reinforcement configuration can be used in shear walls, horizontal diaphragms or roof diaphragms of a building. The truss reinforcement provides a second load path turning the shear wall panel into a dual truss shear wall. The amount of load carried by truss action versus shear wall action is a function of the relative stiffness of the two systems.

The FRP reinforcements can be in the form of corner reinforcements that cover a generally triangular area of the corners or a generally rectangular area of the corners. The term "generally triangular" means approximately triangular, and the term "generally rectangular" means approximately rectangular. As shown in FIG. 6, triangular patches 50 of FRP reinforcements can be incorporated into each of the corners of the panel 38. As shown in FIG. 7, rectangular patches 52 of the FRP reinforcement material can be incorporated into the corners. The corner reinforcement can be longitudinal FRP reinforcements in the form of strips 54 that extend diagonally from the corners, as shown in FIG. 8.

Figure 9:
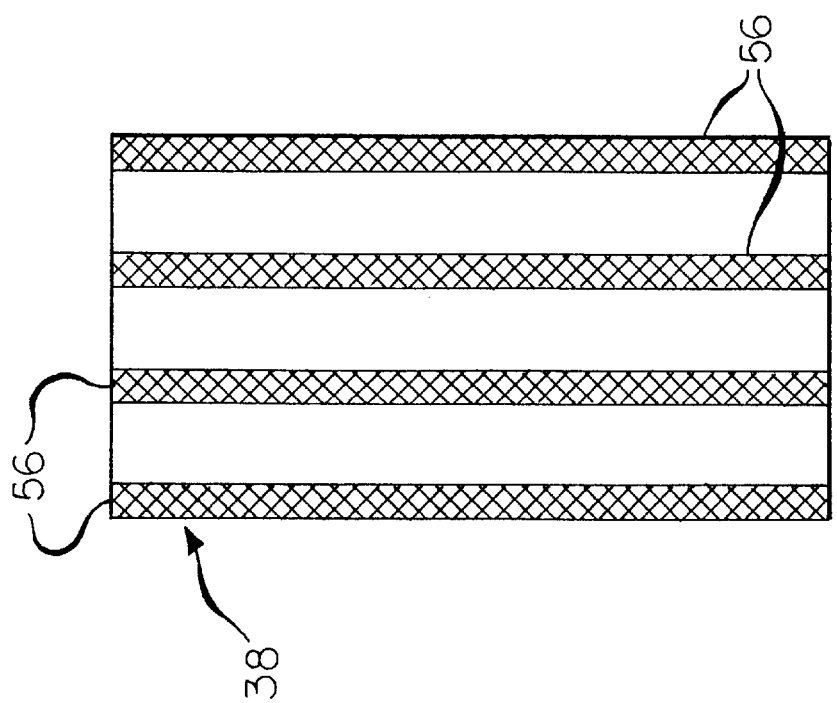

FIG. 9 shows that the FRP reinforcements can be in the form of intermittent reinforcement strips 56 incorporated into the generally rectangular panel 38. The reinforcement strips 56 extend along the length of the panel. Preferably, the spacing of the intermittent reinforcement strips 56 is such that the reinforcement strips are on centers that generally coincide with the intended framing construction for the building. The term "generally coincide" means approximately coincide. For example, where the framing (studs, joists, etc.) is based on 24 inch centers, the intermittent reinforcement strips would also be spaced on 24 inch centers so that the reinforcement strips can be generally aligned in the field with the framing members. The term "generally aligned" means approximately aligned, and the term "framing members" means studs and/or joists. The width of each reinforcement strip may vary. The orientation of the reinforcement fibers within the reinforcement strips 56 with respect to the panel can vary as required. One or more layers of reinforcement can be used. The objective of intermittent longitudinal reinforcement is to reduce nail head pullout and nail pull-through, as well as to increase the energy dissipation capabilities of the panel. The type of fiber and amount of reinforcement can be optimized using standard laminate analysis techniques and finite element methods.

Figure 10:
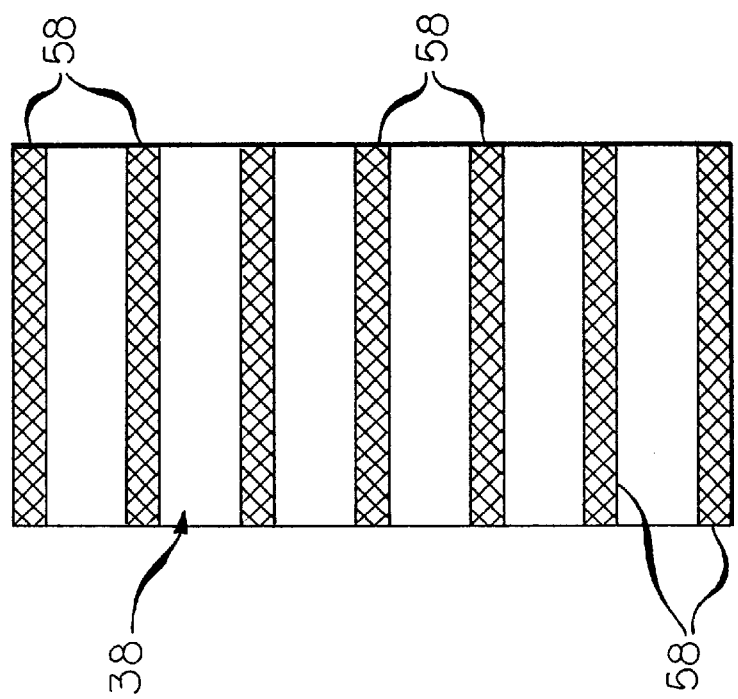
FIGS. 9 and 10 are schematic plan views of a wood sheathing panel having reinforcement strips incorporated intermittently into the panel according to the invention.

FIG. 10 illustrates the use of intermittent reinforcements 58 in the short dimension of the panel, i.e., extending transversely or across the width of the panel. The FRP reinforcements 58 are preferably added at locations coincident with the building framing members to which the panel is to be attached. FIG. 10 shows two layers of reinforcement at 90 degree angles to each other. The objective of the intermittent transverse reinforcements 58 is to reduce nail head pullout and nail pull-through, as well as increase nail shear strength and the energy dissipation capabilities of the panel. The type of fiber and amount of reinforcement can be optimized using standard laminate analysis techniques and finite element methods.

Figures 11, 12, 13:
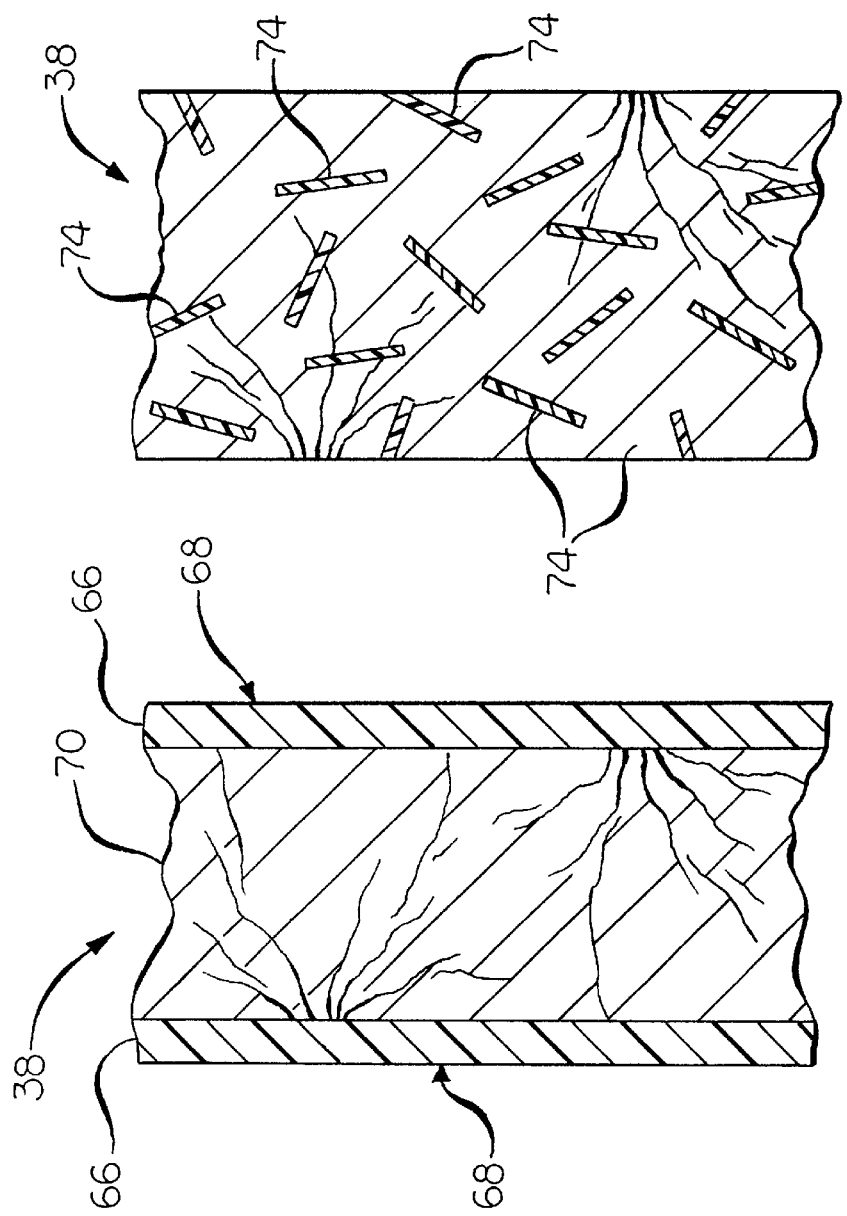
FIG. 11 is a schematic cross-sectional view of a portion of a wood sheathing panel, illustrating reinforcement strips incorporated into the interior of the panel according to the invention.
FIG. 12 is a schematic cross-sectional view of a portion of a wood sheathing panel, illustrating reinforcement strips incorporated onto the major surfaces of the panel according to the invention.
FIG. 13 is a schematic cross-sectional view of a portion of a wood sheathing panel, illustrating reinforcement strips incorporated into the interior of the panel, positioned at various and different angles to the edges of the panel according to the invention.

One method of incorporating the FRP reinforcements into the wood sheathing panel to form the panel 38 of the invention is to position the FRP reinforcements in the interior of the wood sheathing panel. As shown in FIG. 11, the reinforcement layer 62 can be located near the panel mid-thickness or mid-plane. In this approach, one or more layers of reinforcement having various fiber orientations and having the required total thickness are sandwiched between and bonded to two wood-composite panels 64 having equal or different thickness. Location of panel reinforcement layer 62 near the panel mid-thickness may be advantageous for large-scale automated panel production.

As shown in FIG. 12, incorporation of the FRP reinforcement into the wood sheathing panel of the invention can also be accomplished by applying reinforcement layers 66 on both outside major surfaces 68 of the panel 38, surrounding the wood core 70. Alternatively, panel reinforcement may be located on only one side of the panel. The number and thickness of reinforcement layers on either or both major surfaces 68 can be varied as required, and the thickness of the wood composite panel 38 can be varied as required.

FIG. 13 shows that the reinforcement strips 74 can be dispersed throughout the volume or thickness of the wood sheathing panel 38. The fiber orientation within the panel may be random as shown or the fibers may be oriented in a particular direction. In one particular arrangement of the invention, the reinforcement strips are positioned within the interior of the panel, with the reinforcing fibers within the reinforcement strips being oriented at various and numerous different angles to the edges of the panel. In one of the aspects of the invention, the reinforcement is simply chopped fibers incorporated into the areas of the panels where critical reinforcements are needed, such as at the perimeter and corners of the panels. It can be seen from the panels disclosed in FIGS. 11–13 that the term "incorporated" means that the reinforcement strips or layers can be placed either within the interior of the wood sheathing panel or on the exterior of the panel, or both. This applies to all the reinforcement arrangements shown in FIGS. 4–11. The thickness of the reinforcement should be such that it can easily be penetrated using standard nails or other fasteners. Placement of the reinforcement at the mid-plane of the panel makes it easier to start the nail. Also, it is to be understood that any panel reinforcement arrangement disclosed in this specification can be used in combination with any other panel reinforcement arrangement. For example, the corner reinforcement arrangement of FIG. 6 can be used in combination with the perimeter arrangement of FIG. 4. Preferably, the reinforcement strips covering an area that is within the range of from about 5 to about 50 percent of the surface area of the panel, and most preferably within the range of from about 5 to about 25 percent of the surface area of the panel.

The wood sheathing panels of the invention are not limited to using any specific FRP type, resin type, synthetic fiber type, fiber architecture, laminate design, material delivery system, or any specific method of incorporation into the wood sheathing panel 38. Any suitable thermosetting resin, such as phenolic, epoxy, vinylester, polyester, and the like, or thermoplastic resin combined with properly sized synthetic fibers, such as carbon, E-glass, S-glass, aramid, and the like, may be used. The, FRP reinforcements that are incorporated into the sheathing may be in the form of pre-cured sheets, pre-impregnated fabrics (prepregs), or wet-impregnated fibers, fabrics or mats. The optimum FRP design depends on the application and may be determined using standard laminate analysis techniques, finite element analysis methods, and established composite materials design methods.

The orientation of the fibers within the FRP reinforcement strips 48 and 54 (FIGS. 5 and 8) of the invention is generally longitudinal with respect to the length of the reinforcement strips. However, in many applications, the FRP reinforcement strips will have the fibers in other orientations, such as, for example, in a crossed pattern as shown in FRP reinforcements 42, 50, 52, 56 and 58 (FIGS. 4, 6, 7, 9, and 10). Mats of woven fibers can also be used with the invention. While strips having oriented reinforcement fibers are generally preferred, mats of non-oriented fibers, such as wet process mats can be used.

An example of an FRP reinforcement strip of the invention is a fiberglass reinforced phenolic composite using a phenolic resin and a 26 ounce fabric, product code VEW 260, from Brunswick Technologies, Brunswick, Maine. The resin to fiber ratio for this product is about 50/50. The fibers are all parallel, and are held together without a backing. The tensile strength of the reinforcement strip is 60,000 pounds per square inch (60 kpsi) in the longitudinal direction, and the stiffness is 4–6 million psi.

Another reinforcement product that can be used is Brunswick's U-18-01 unidirectional fabric, having longitudinal fibers stitched to a fabric backing. Yet another reinforcement product that can be used with the invention is Brunswick's Q-30 product, which is 30 oz. per square yard cross weave product having fibers oriented longitudinally and transversely, and also fibers oriented at plus or minus 45 degrees to the longitudinal.

The FRP reinforcement strips used with the invention can be purchased with or without the resin. Where the FRP reinforcements are applied to the exterior of the wood sheathing panel 38, application involves wetting the reinforcement with the resin, applying the reinforcement to the desired location, and rolling the wetted reinforcement to assure good contact and to remove trapped air. Alternatively, the reinforcement can be purchased as a prepreg, applied to the desired location with or without additional resin, and heated to advance the resin and bond the reinforcement to the wood panels.

With proper design, the FRP reinforcement strips of the invention improve the continuity and load transfer between the individual sheathing panels. Most importantly, the reinforcement strips reduce the likelihood of individual roof or wall sheathing panels loss, the leading cause of wind and subsequent water related damage to wood construction during hurricanes. The strips also reduce stress concentrations at the edge of the panels, restrain panel edge and corner curling or tear-out in shear walls, improve load distribution characteristics among sheathing nails, increase nail lateral resistance, and delay sheathing nail withdrawal or failure.

It is to be understood that the reinforcement strips incorporated into the wood sheathing panel of the invention can have any suitable widths, and can be of any suitable construction, for reinforcing the panels. Also, the truss reinforcement strips 48 and 54 can be set at any desired angle with respect to the longitudinal edges of the panel. Because the reinforcement strips incorporated into the panels strengthen the panels, improper nail spacing, improper nail edge distance, and improper nail penetration into the framing are less likely to result in damage to the structure when subjected to hurricane winds or earthquake loadings.

Figure 14:
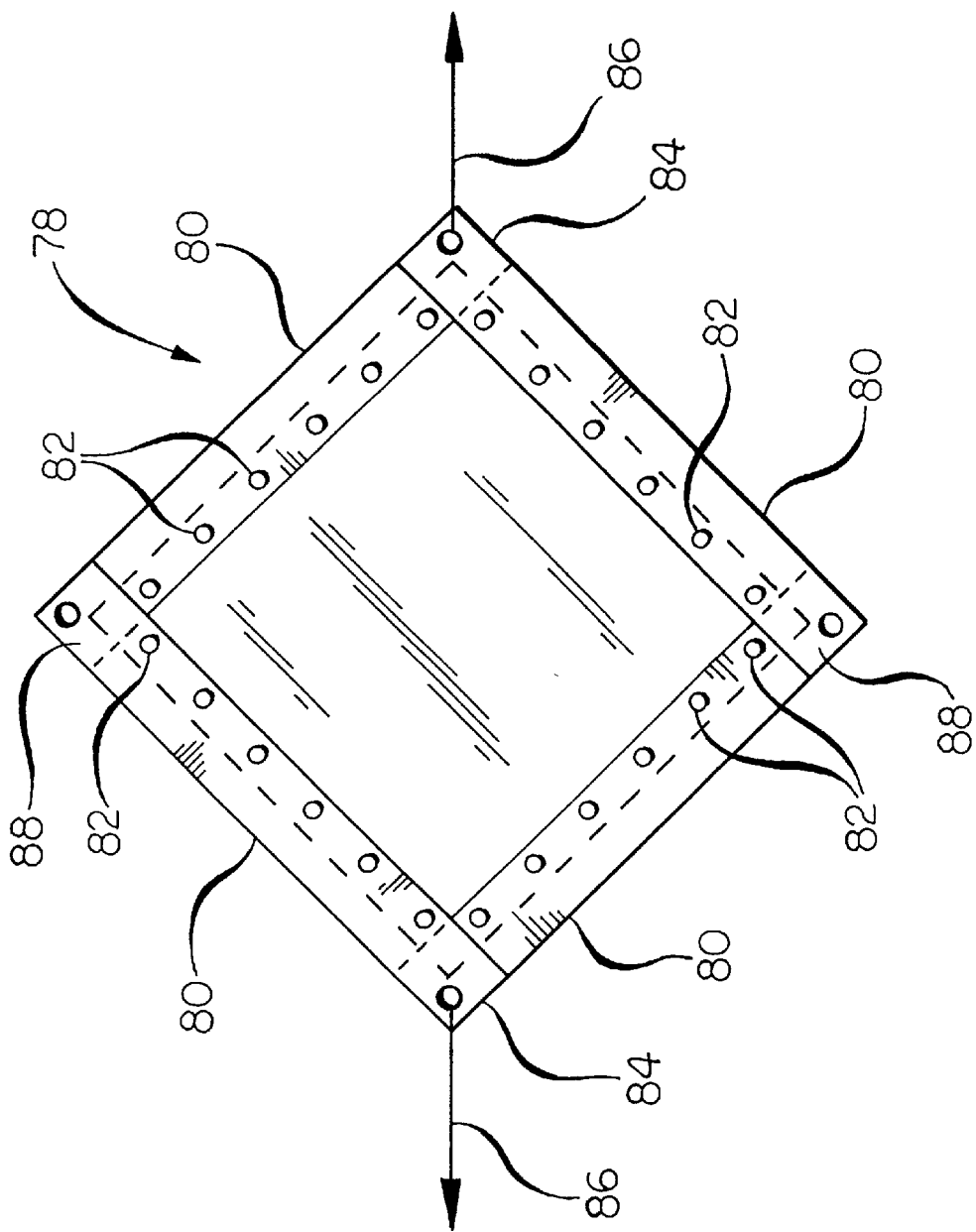
FIG. 14 illustrates a pure in-plane shear test being performed on a panel of the invention.

The reinforcement of the wood sheathing panels 38 of the invention dramatically increases the lateral shear strength of the panel, and a test of the improvement in strength was conducted using a pure in-plane shear test, as shown in FIG. 14. First, a 2 foot by 2 foot unreinforced OSB panel 78 was selected. Then a steel grip consisting of strips 80 was bolted around the entire perimeter of the panel using bolts 82. Two diagonal corners 84 of the steel strips were attached to a load source, indicated by arrows 86. The other two corners 88 of the steel strips were hinged for flexibility. A load was applied until the panel 78 failed, as exhibited by destruction of the panel. The deflection at the point of failure was recorded.

The experiment was then applied to a different panel that was identical except for a perimeter reinforcement similar to that shown in FIG. 4. The deflection of this second, reinforced panel at the failure point was over two times the deflection of the first, unreinforced panel at its failure point. Additional experiments using even greater amounts of reinforcement resulted in even greater improvements in the load/deflection relationship. In some of these different arrangements the deflection at the failure point of the reinforced panel was three times the deflection of the first, unreinforced panel at its failure point.

It is important to select appropriate reinforcement materials (fibers/sizings and resins) and a proper manufacturing process. Durability, FRP-panel bond strength, cost effectiveness, and ease of manufacture must be considered when selecting the fiber/resin/process combination. E-glass, carbon and aramid fiber are preferred. Hybrid reinforcements consisting of combinations of one or more of the three reinforcements may also be used. The two preferred resin systems for use in bonding the synthetic reinforcement to the wood substrate are phenolic systems and vinyl ester systems. However others may be used. Durable, effective bonding of E-glass to a wood substrate can be achieved using phenolic resins. E-glass is available with is phenolic sizings but experience has shown that standard E-glass sizings are compatible with phenolic resins. Vinyl ester resins can also produce durable bonds to wood substrates when the wood surface is primed with an hydroxy methyl resorcinol (HMR) coupling agent to enhance the adhesive bonding of epoxy and other thermosetting adhesives to wood.

The reinforcement may be introduced before the panels are cured in a hot press. Alternatively, pre-consolidated thin OSB or plywood panels can be post-bonded in a hot press with the reinforcement sandwiched in between, thereby forming a thicker panel. Different types, numbers, and weights of fabrics can be used, such as for example 18 oz./yd.$^2$ or 26 oz./yd.$^2$ BTI (Brunswick Technologies) uniweave products. The wetpreg wet fiber-to-resin ratio may be maintained at approximately 1:1 but other ratios may be used. Preconsolidated FRP may be bonded to the OSB or plywood using adhesive spreads of between 30 lbs./MSGL (1000 sq. ft. of single glueline) to 70 lbs./MSGL to coincide with adhesive spreads commonly used for bonding wood laminations, but other values may be used.

The invention includes adding synthetic reinforcement that is properly dispersed, located, oriented and adhered within or over the wood composite panel. The synthetic reinforcement increases the in-plane shear and tension strength of the OSB or plywood panel, increases nail lateral and withdrawal resistance, reduces corner tearout of the panel, and improves the panel's overall hysteretic behavior. The panel of the invention directly addresses commonly observed deficiencies in the performance of conventional wood-framed shear walls, thereby bringing about significant improvements in wood shear wall technology. The reinforcement strips are sufficient to provide an increased ductility over an equivalent unreinforced wood sheathing panel in an amount within the range of from about 75 percent to about 500 percent.

While the wood sheathing panel of the invention preferably has reinforcement strips covering an area that is within the range of from about 5 to about 50 percent of the surface area of the panel, where the reinforcement strips of fiber reinforced polymer material are positioned within the interior of the panel, the reinforcement strips may cover a larger percentage of the surface of the panel. For example, the reinforcement strips within the interior of the panel may cover an area that is within the range of from about 5 to about 100 percent of the surface area of the panel. When considering embodiments of the invention where the reinforcement strips are positioned within the interior of the panel, it is to be understood that the term "surface area of the panel" means the equivalent surface coverage if the reinforcement strips were on the surface instead of within the interior.

The principle and mode of operation of this invention have been described in its preferred embodiments. However, it should be noted that this invention may be practiced otherwise than as specifically illustrated and described without departing from its scope.

What is claimed is:

1. A wood sheathing panel, suitable for use in building construction, the wood sheathing panel having a surface area and including reinforcement strips of fiber reinforced polymer material incorporated into the panel, the reinforcement strips covering an area of the surface area that is within the range of from about 5 to about 50 percent of the surface area of the panel.

2. The wood sheathing panel of claim 1 in which the panel has edges and in which the reinforcement strips of fiber reinforced plastic material are incorporated into the panel in diagonal strips that are at acute angles to the edges of the panel.

3. The wood sheathing panel of claim 2 having diagonally opposed corners, and in which the reinforcement strips extend diagonally between opposed corners.

4. The wood sheathing panel of claim 1 in which the reinforcement strips of fiber reinforced plastic material are incorporated in the perimeter of the panel.

5. The wood sheathing panel of claim 1 having corners and in which the reinforcement strips of fiber reinforced plastic material are incorporated into the corners of the panel.

6. The wood sheathing panel of claim 5 in which the reinforcement strips cover a generally triangular area of the corners.

7. The wood sheathing panel of claim 5 in which the reinforcement strips cover a generally rectangular area of the corners.

8. The wood sheathing panel of claim 5 which the reinforcement strips extend diagonally from the corners.

9. The wood sheathing panel of claim 1 which is generally rectangular, and in which the reinforcement strips are incorporated intermittently within the panel, with the reinforcement strips extending along the length of the panel.

10. The wood sheathing panel of claim 9 in which the spacing of the intermittently incorporated reinforcement strips generally coincides with a spacing of framing members of a building so that when the wood sheathing panel is applied to the framing members of the building, the reinforcement strips are generally aligned with the framing members of the building.

11. The wood sheathing panel of claim 1 which is generally rectangular, and in which the reinforcement strips are incorporated intermittently within the panel, with the reinforcement strips extending across the width of the panel.

12. The wood sheathing panel of claim 11 in which the spacing of the intermittently incorporated reinforcement strips generally coincides with a spacing of framing members of a building so that when the wood sheathing panel is applied to the framing members of the building, the reinforcement strips are generally aligned with the framing members of the building.

13. The wood sheathing panel of claim 1 in which the reinforcement strips are positioned within the interior of the panel.

14. The wood sheathing panel of claim 13 in which the panel has edges, and in which the reinforcement strips are positioned within the interior of the panel, with the reinforcing fibers within the reinforcement strips being oriented at various different angles to the edges of the panel.

15. The wood sheathing panel of claim 1 in which the panel has two major surfaces, and in which the reinforcement strips are positioned on the major surfaces.

16. The wood sheathing panel of claim 1 in which the reinforcement strips are sufficient to provide an increased ductility over an equivalent unreinforced wood sheathing panel in an amount within the range of from about 75 percent to about 500 percent.

17. A building comprising a plurality of the wood sheathing panels of claim 1, where each of the panels is one element of a group consisting essentially of shear walls, horizontal diaphragms and roof diaphragms.

18. A wood sheathing panel, suitable for use in building construction, including reinforcement strips of fiber reinforced polymer material incorporated into the panel, the reinforcement strips covering an area that is within the range of from about 5 to about 50 percent of the surface area of the panel, wherein the reinforcement strips of fiber reinforced plastic material are incorporated into the corners of the panel and into the perimeter of the panel, wherein the reinforcement strips are sufficient to provide an increased ductility over an equivalent unreinforced wood sheathing panel in an amount within the range of from about 75 percent to about 500 percent.

19. The wood sheathing panel of claim 18 in which the reinforcement strips are positioned within the interior of the panel.

20. The wood sheathing panel of claim 18 in which the panel has two major surfaces, and in which the reinforcement strips are positioned on the major surfaces.

21. A wood sheathing panel, suitable for use in building construction, including reinforcement strips of fiber reinforced polymer material incorporated into the panel, the reinforcement strips covering an area that is within the range of from about 5 to about 50 percent of the surface area of the panel, wherein the reinforcement strips are positioned within the interior of the panel.

22. The wood sheathing panel of claim 1 in which the wood sheathing panel is a plywood panel.

23. The wood sheathing panel of claim 1 in which the wood sheathing panel is an oriented strand board panel.

24. The wood sheathing panel of claim 18 in which the wood sheathing panel is a plywood panel.

25. The wood sheathing panel of claim 18 in which the wood sheathing panel is an oriented strand board panel.

26. The wood sheathing panel of claim 21 in which the wood sheathing panel is a plywood panel.

27. The wood sheathing panel of claim 21 in which the wood sheathing panel is an oriented strand board panel.

* * * * *